United States Patent
Jackovich

(10) Patent No.: US 6,270,670 B1
(45) Date of Patent: Aug. 7, 2001

(54) WATER FILTRATION ASSEMBLY

(75) Inventor: James D. Jackovich, Clinton Township, MI (US)

(73) Assignee: Talhin/T Corp., Consumer Products Division, Oldcastle (CA)

(*) Notice: Subject to any disclaimer, the term of this patent is extended or adjusted under 35 U.S.C. 154(b) by 0 days.

(21) Appl. No.: 09/333,089

(22) Filed: Jun. 15, 1999

(51) Int. Cl.[7] .......................... B01D 27/08; B01D 27/14; B29C 65/00

(52) U.S. Cl. .................................. 210/323.2; 210/323.1; 210/445; 210/446; 210/448; 210/451; 210/452; 210/455; 264/209.1; 264/248; 264/DIG. 48; 264/DIG. 76

(58) Field of Search .......................... 210/323.2, 323.1, 210/455, 451–453, 445, 282, 433.1, 435, 446–448, 456; 156/60, 69, 73.1, 73.5; 264/DIG. 48, DIG. 76, 209.1, 248; 55/497–498, 503

(56) References Cited

U.S. PATENT DOCUMENTS

| | | | |
|---|---|---|---|
| 616,224 | * 12/1898 | Cullison . | |
| 3,003,500 | * 10/1961 | Barton et al. . | |
| 3,295,686 | * 1/1967 | Krueger . | |
| 3,782,083 | * 1/1974 | Rosenberg . | |
| 3,954,625 | * 5/1976 | Michalski | 210/445 |
| 4,170,056 | * 10/1979 | Meyst et al. . | |
| 4,528,097 | * 7/1985 | Ward | 210/353 |
| 4,558,957 | * 12/1985 | Mock et al. . | |
| 4,944,977 | * 7/1990 | Shantz et al. . | |
| 5,116,502 | * 5/1992 | Ferguson | 210/266 |
| 5,277,805 | * 1/1994 | Ferguson | 210/266 |
| 5,833,852 | * 11/1998 | Yoon | 210/447 |
| 5,891,333 | * 4/1999 | Ferguson | 210/232 |
| 5,965,019 | * 10/1999 | Olsen et al. | 210/331 |

FOREIGN PATENT DOCUMENTS

| | | |
|---|---|---|
| 3429634A1 | * 2/1986 | (DE) . |
| 9-267092 | * 10/1997 | (JP) . |

* cited by examiner

Primary Examiner—W. L. Walker
Assistant Examiner—Marianne Ocampo
(74) Attorney, Agent, or Firm—Howard & Howard

(57) ABSTRACT

A water filtration assembly (10) includes a first end cap (34) covering the first end of a housing (12) and a second end cap (36) covering the second end of the housing (12). The end surface (40) of each end cap (34 and 36) has a L-shaped cap recess therein with an axial leg (42) and a transverse leg (44) extending about the end face. A projection (30) at the first end of the housing (12) is disposed in engagement with the cap recess of the first end cap (34) as the end surface (40) of the first end cap (34) abuts the recess end surface (28) at the first end of the housing (12). In the same fashion, a projection (30) at the second end of the housing (12) is disposed in engagement with the cap recess of the second cap (36) as the end surface (40) of the second cap (36) abuts the recess end surface (28) at the second end of the housing (12). The end caps (34 and 36) are formed with a two sided shoulder (46) filling the corner between the axial (42) and transverse (44) legs of the cap recess. The projections (30) at the ends of the housing (12) are inserted into engagement with the cap recesses of the caps (34 and 36) as the distal ends (32) of the projections (30) abut the shoulders (46) in the cap recesses at the ends of the housing (12). The respective shoulders (46) are melted into a fusion bond between the distal end (32) of each projection (30) and each of the transverse legs (44) of the cap recesses. During this fusion, flash (48) is created and extends into the filter chamber. When the end caps (34 and 36) are fused in fluid tight engagement with the housing (12), the exterior surface (38) of each of the end caps (34 and 36) is spaced outwardly of the outer surface (14) of the housing (12) to define a step (x) between the outer surface (14) of the housing (12) and the exterior surface (38) of each of the end caps (34 and 36).

15 Claims, 4 Drawing Sheets

WATER FILTRATION ASSEMBLY

BACKGROUND OF THE INVENTION

1. Field of the Invention

The subject invention relates to a water filter assembly and method for fabricating same, particularly, a water filter assembly for domestic use.

2. Description of the Prior Art

A number of water filter assemblies are known for filtering tap water in the home. It is important that such assemblies be compact

SUMMARY OF THE INVENTION AND ADVANTAGES

A water filtration assembly comprising an elongated housing having an outer surface surrounding at least one filter chamber extending between first and second open ends. The outer surface has a housing recess therein adjacent each of the first and second ends of the housing and extends about the periphery of each end to define a recess end surface and a peripheral projection extending to a distal end from the recess end surface at each end of the housing. A first end cap covers the first end and a second end cap covers the second end. Each of the end caps has an end face with a periphery and a peripheral wall having an exterior surface extending from the periphery of the end face to an end surface, the peripheral wall and the end face defining an interior cavity with a bottom and interior wall surfaces. The end surface has an L-shaped cap recess therein with an axial leg and a transverse leg extending about the end face with the transverse leg opening into the interior cavity. The projection at the first end of the housing is disposed in engagement with the cap recess of the first cap as the end surface of the first cap abuts the recess end surface at the first end of the housing. The projection at the second end of the housing is disposed in engagement with the cap recess of the second cap as the end surface of the second cap abuts the recess end surface at the second end of the housing. The assembly is characterized by the exterior surface of each of the end caps being spaced outwardly of the outer surface of the housing to define a step between the outer surface of the housing and the exterior surface of each of the end caps.

The invention also includes the method of fabricating a water filtration assembly comprising the steps of forming an elongated housing having an outer surface surrounding at least one filter chamber extending between first and second open ends, forming a housing recess in the outer surface of the housing adjacent each of the first and second ends of the housing and extending about the periphery of each end to define a recess end surface and a peripheral projection extending to a distal end from the recess end surface at each end of the housing, forming a first end cap for covering the first end, forming a outlet end cap for covering the second end, forming each end cap with an end face having a periphery and a peripheral wall having an exterior surface extending from the periphery of the end face to an end surface to define an interior cavity with a bottom and interior wall surfaces, forming a L-shaped cap recess in each end surface with an axial leg and a transverse leg extending about the end face with the transverse leg opening into the interior cavity, forming a two sided shoulder filling the corner between the axial and transverse legs of the cap recess, inserting the projection at the first end of the housing into engagement with the cap recess of the first cap as the distal end of the projection abuts the shoulder in the cap recess at the first end of the housing, inserting the projection at the second end of the housing into engagement with the cap recess of the second cap as the distal end of the projection abuts the shoulder in the cap recess at the second end of the housing, and melting the respective shoulders into a fusion bond between the distal end of each projection and each of the transverse legs of the cap recesses.

The subject invention provides a specific construction which is compact, sturdy and free of leakage yet retains the feature of easy and rapid filter cartridge replacement.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is an interior view of one end cap;

DETAILED DESCRIPTION OF THE PREFERRED EMBODIMENT

Referring to the Figures, wherein like numerals indicate like or corresponding parts throughout the several views, a water filtration assembly is generally shown at 10.

Figure 5:
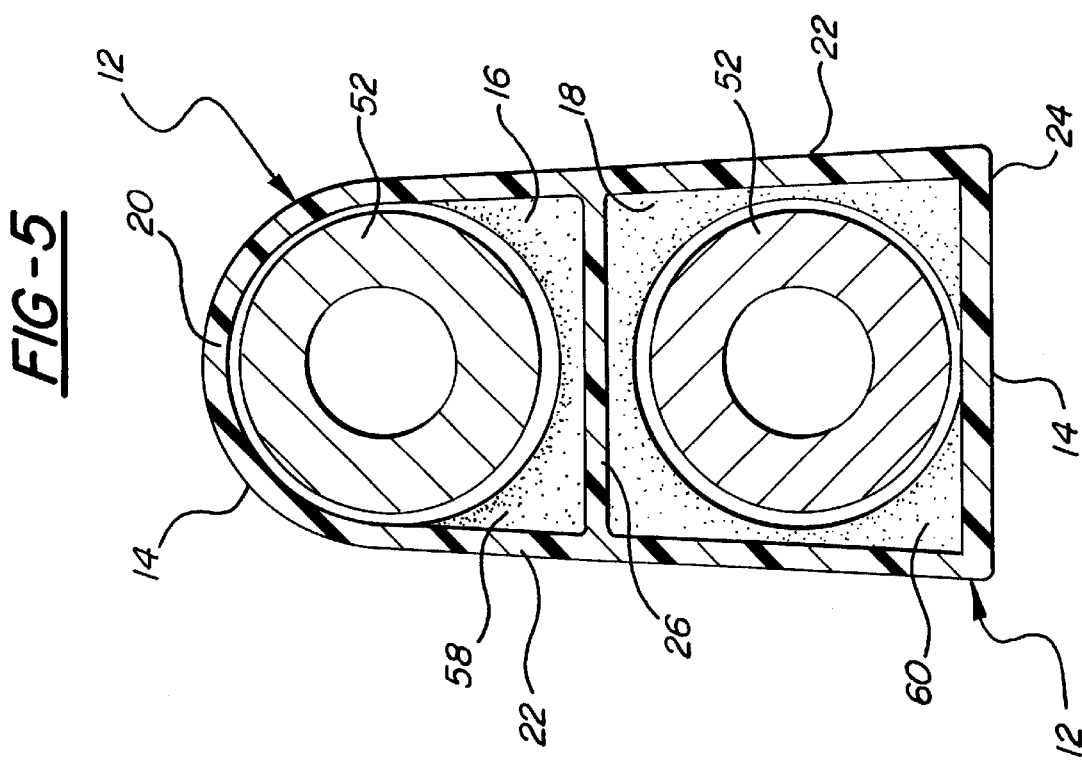
FIG. 5 is a cross sectional view taken along line 5—5 of FIG. 1.
Figure 4:
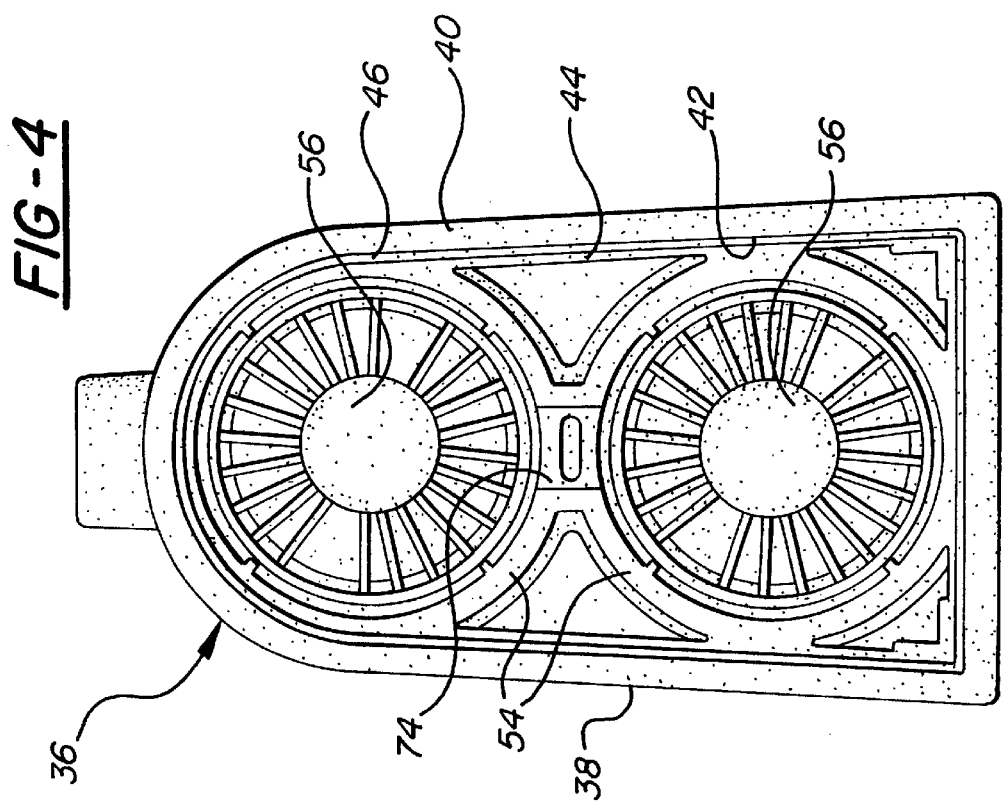
FIG. 4 is an interior view of the other end cap.

The assembly 10 includes an elongated housing, generally indicated at 12, having an outer surface 14 surrounding at least one filter chamber extending between first and second open ends. In the preferred embodiment there are two, or first and second, filter chambers 16 and 18. The first mentioned filter chamber 16 has a semi-circular top 20 defined by the top of the housing 12, the housing 12 having side walls 22 extending between the semi-circular top 20 and the flat bottom 24. A partition 26 extends horizontally between the side walls 22 and the ends of the housing 12 for defining the second filter chamber 18, which has four sides as viewed in the cross section of FIG. 5. The flat bottom 24 extends from end to end as does the semi-circular top 20.

Figure 7:
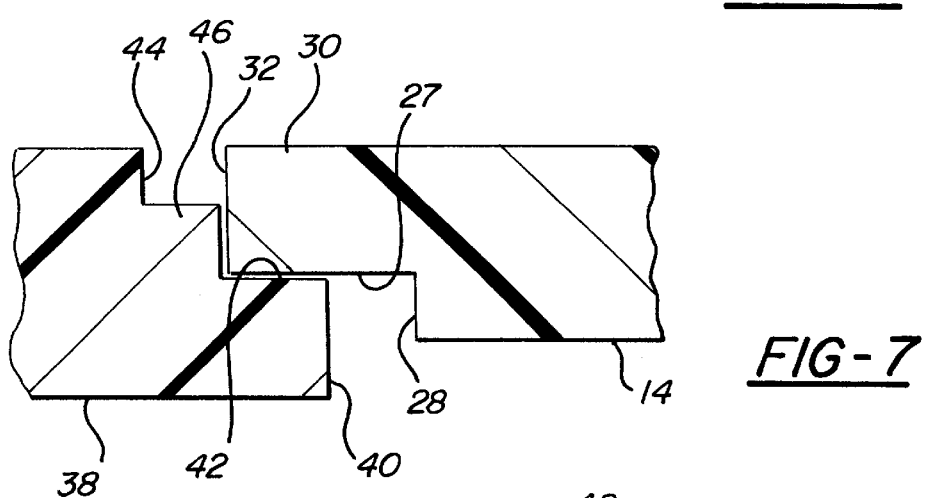
FIG. 7 is an enlarged fragmentary view showing the housing and end cap before being fused together.
Figure 8:
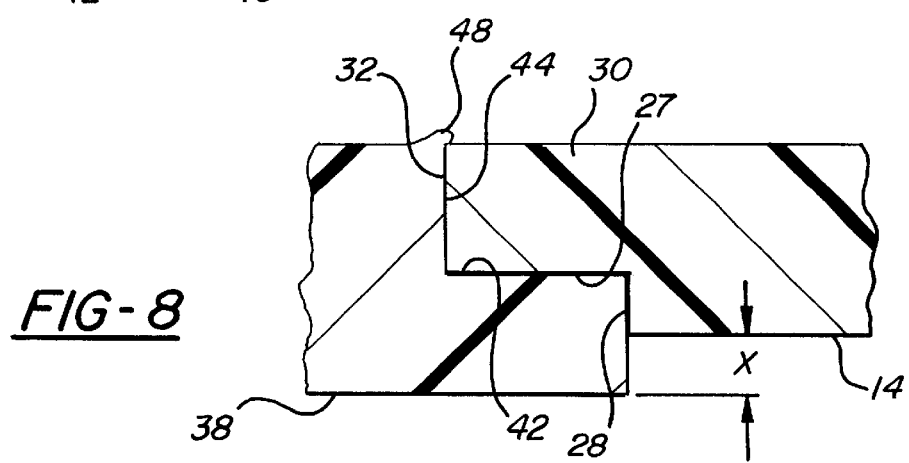
FIG. 8 is an enlarged fragmentary view taken in the circle of FIG. 6 and like FIG. 7 but showing the components fused together.

As illustrated in FIGS. 7 and 8, the outer surface 14 has a housing recess 27 at each of the first and second ends of the housing 12 and extending about the periphery of each end to define a recess end surface 28 and a peripheral projection 30 extending to a distal end 32 from the recess end surface 28 at each end of the housing 12.

A first end cap, generally indicated at 34, covers the first end of the housing 12 and a second end cap, generally indicated at 36, covers the second end of the housing 12. Each of the end caps 34 and 36 has an outer end face with a periphery and a peripheral wall having an exterior surface 38 extending from the periphery of the end face to an end surface 40. The peripheral wall and the end face of each of the end caps 34 and 36 define an interior cavity with a bottom and interior wall surfaces. The end surface 40 has a L-shaped cap recess therein with an axial leg 42 and a transverse leg 44 extending about the end face with the transverse leg 44 opening into the interior cavity. The projection 30 at the first end of the housing 12 is disposed in engagement with the cap recess of the first end cap 34 as the end surface 40 of the first end cap 34 abuts the recess end surface 28 at the first end of the housing 12. In the same fashion the projection 30 at the second end of the housing 12 is disposed in engagement with the cap recess of the second cap 36 as the end surface 40 of the second cap 36 abuts the recess end surface 28 at the second end of the housing 12.

The assembly is characterized by the exterior surface 38 of each of the end caps 34 and 36 being spaced outwardly of the outer surface 14 of the housing 12 a distance x as shown in FIG. 8 to define a step between the outer surface 14 of the housing 12 and the exterior surface 38 of each of the end caps 34 and 36.

The method of fabricating the water filtration assembly 10 comprises the steps of forming the elongated housing 12 with the housing recess 27 defining the recess end surface 28 and the peripheral projection 30 extending to the distal end 32 at each end of the housing 12. The end caps 34 and 36 are formed with a two sided shoulder 46 filling the corner between the axial 42 and transverse 44 legs of the cap recess. As shown in FIG. 7, the projection 30 at the first end of the housing 12 is inserted into engagement with the cap recess of the first cap 34 as the distal end 32 of the projection 30 abuts the shoulder 46 in the cap recess at the first end of the housing 12. In like fashion, the projection 30 at the second end of the housing 12 is inserted into engagement with the cap recess of the second cap 36 as the distal end 32 of the projection 30 abuts the shoulder 46 in the cap recess at the second end of the housing 12. In this position, the respective shoulders 46 are melted, as by sonic welding, into a fusion bond between the distal end 32 of each projection 30 and each of the transverse legs 44 of the cap recesses. During this fusion, flash 48 is created from the melting of the shoulders 46 and is disposed about the distal end 32 of the peripheral projection 30 and extends into the filter chamber, as shown in FIG. 8. In other words, the flash 48 is disposed about the distal end 32 of the peripheral projection 30 and extends into the filter chambers 16 and 18 as a fusion bond is created between the distal end 32 of the peripheral projection and each of the transverse legs 44 of the cap recesses.

When the end caps 34 and 36 are fused in fluid tight engagement with the housing 12, the exterior surface 38 of each of the end caps 34 and 36 is spaced outwardly of the outer surface 14 of the housing 12 to define a step x between the outer surface 14 of the housing 12 and the exterior surface 38 of each of the end caps 34 and 36.

The first end cap 34 includes a pair of circular filter end supports 50 extending from the bottom of the cavity of the first end cap 34 for engaging and supporting filter cartridges 52. The second end cap 36 includes a pair of plug opening walls 54 extending into the cavity and including a pair of plugs 56 disposed in the plug openings 54. More specifically, the plug openings 54 and plugs 56 include coacting threads to threadedly engage the plugs 56 in the plug openings 54.

An upper chamber support rib 58 is disposed in the first chamber 16 and is spaced midway from the ends thereof for supporting a filter cartridge 52 and a lower chamber support rib 60 is disposed in the second chamber 18 and is spaced midway from the ends thereof for supporting a filter cartridge 52. Each of the ribs 58 and 60 presents a circular edge for complementing the cylindrical filter cartridges 52.

A filter cartridge 52 is disposed in each of the chambers 16 and 18 and each cartridge 52 comprises a cylindrical core and cap seal 62 at one end and supported by and in sealing engagement with one of the filter end supports 50. An O-ring or seal 64 is disposed in an annular groove in an annular projection of each cap seal 62 and is in sealing engagement with the interior of the adjacent filter end support 50.

Figure 6:
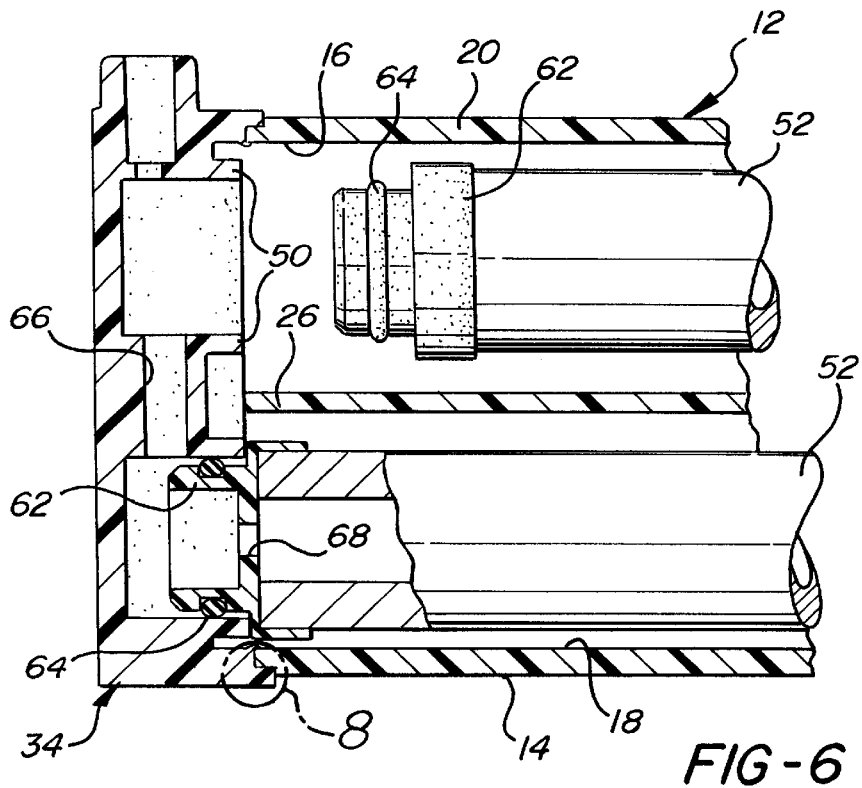
FIG. 6 is a fragmentary cross sectional view of the one end.

The first end cap 34 defines an outlet or first water passage 66 for establishing communication between the filter end supports 50 and the exterior of the first end cap 34 and each cap seal 62 has a central hole 68 (FIG. 6) for the flow of water between the interior of the cylindrical core and the first water passage 66. The first end cap 34 also includes strengthening webs 67 in the cavity thereof to reinforce the back or inside of the exterior surface 38.

Figure 1:
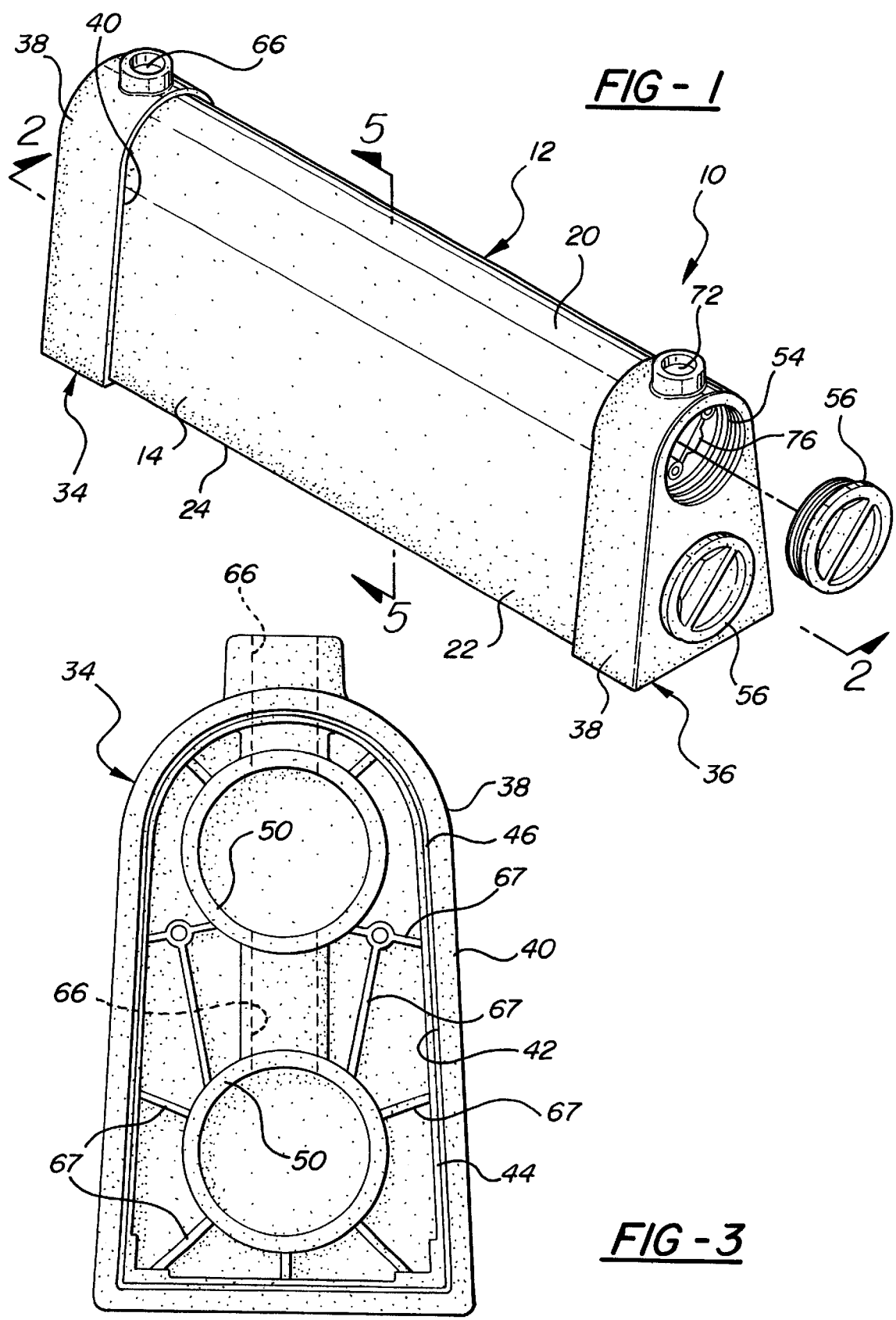
FIG. 1 is a perspective view of a preferred embodiment.
Figure 2:
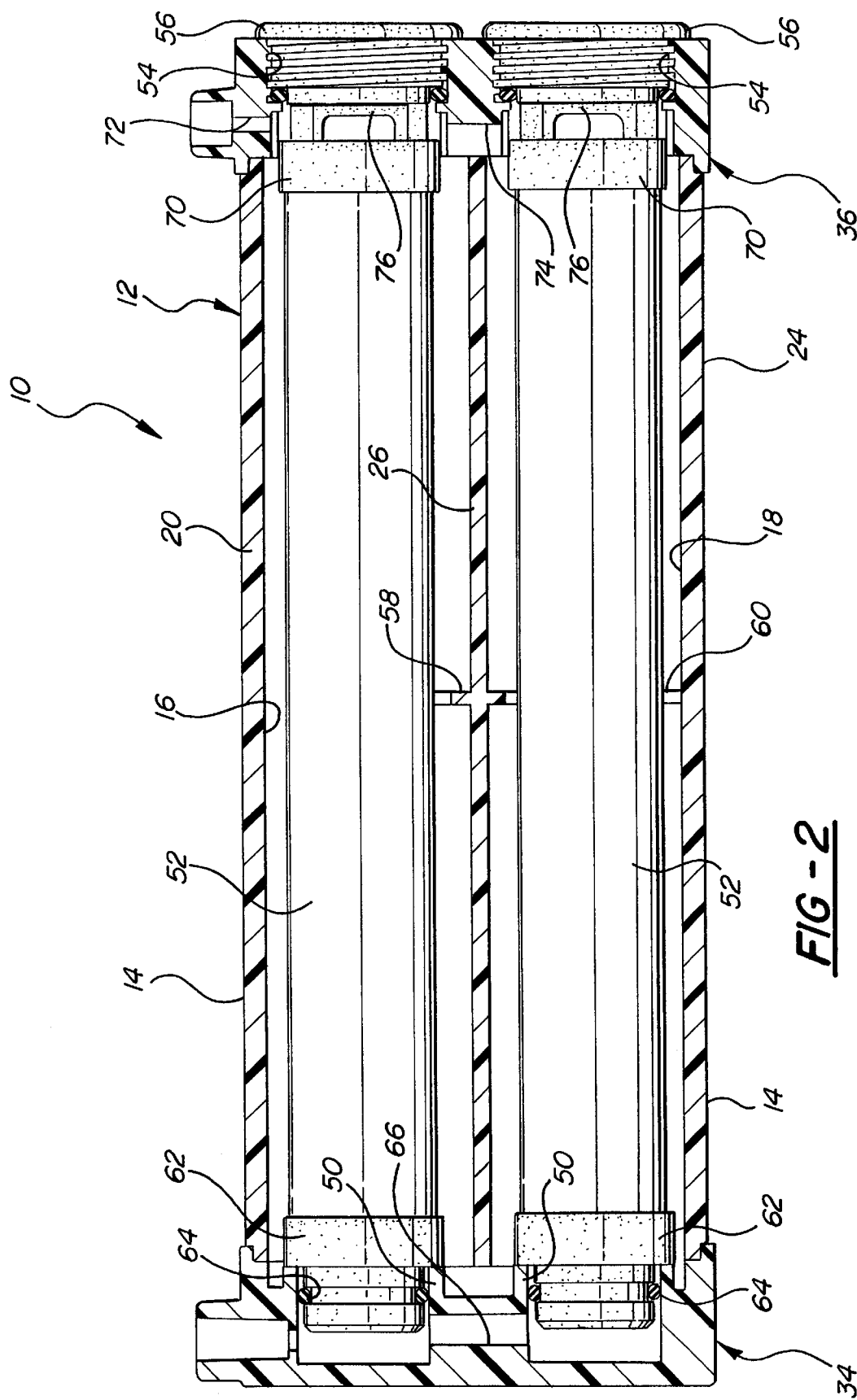
FIG. 2 is a cross sectional view taken along line 2—2 of FIG. 1.

Each filter cartridge 52 also includes an end piece 70 (FIG. 2) covering the other end of the cylindrical core. When installed, each end piece 70 is supported by a plug opening 54. The second end cap 36 defines an inlet or second water passage having portions 72 and 74 for establishing communication around the end pieces and between the two chambers 16 and 18 and the exterior of the second end cap 36. The end piece 70 is solid to direct the flow of water between the interior of the cylindrical core and the second water passage portions 72 and 74 and includes a handle 76 extending diametrically across for manually inserting and removing the cartridge 52.

Although the assembly may include only one chamber, the preferred embodiment includes the second filter end support 50 and the second end cap 36 with the second plug opening 54 wall extending into the cavity thereof and the second plug 56 disposed in the second plug opening 54. The first connecting water (outlet) passage 66 extends between the filter end supports 50 in the first end cap 34 and the second connecting water (inlet) passage portions 72 and 74 extends between the plug openings 54 of the second end cap 36.

The two ribs 58 and 60 surround and support the two filter cartridges 52, the first rib 58 defining a semi-circular opening to coact with the semi-circular top 20 of the housing 12 and the second rib 60 defines a substantially circular hole for surrounding the second filter cartridge 52.

Once the cartridges 52 are inserted into the chambers 16 and 18, the plugs 56 are threaded into the plug openings 54. The passage 72 is connected to a source of water which flows into the end cap 36 and is forced around the end pieces 70 and along the core of the cartridges 52. The water flows into the center of each cartridge 52, the flows in the respective chambers 16 and 18 being separated form one another. The filtered water flows out of the center of the cartridges 52 through the openings 68 in the cap seals 62 and out the passage 66.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein that which is prior art is antecedent to the characterized novelty and reference numerals are merely for convenience and are not to be in any way limiting, the invention may be practiced otherwise than as specifically described.

What is claimed is:

1. A water filtration housing assembly comprising;

an elongated housing (12) extending axially and having an outer surface (14) surrounding at least one filter chamber extending between first and second open ends, said outer surface (14) having a housing recess (27) extending radially and axially thereunto adjacent each of said first and second ends of said housing (12) and extending about the periphery of each end to define a recess end surface (28) extending radially and a peripheral projection (30) extending axially to a distal end (32) from said recess end surface (28) at each end of said housing (12), a first end cap (34) covering said first end, a second end cap (36) covering said second end, each of said end caps having an end face with a periphery and a peripheral wall having an exterior surface (38) extending from said periphery of said end face to an end surface (40), said peripheral wall and said end face defining an interior cavity with a bottom and interior wall surfaces, said end surface (40) having a L-shaped cap recess therein with an axially extending axial leg (42) and a radially extending transverse leg (44) extending about said end face with said transverse leg (44) opening into said interior cavity, said projection (30) at said first end of said housing (12) being disposed in engagement with said cap recess of said first cap (34) as said end surface (28) of said first cap (34) abuts said recess end surface (28) at said first end of said housing (12), said projection (30) at said second end of said housing (12) being disposed in engagement with said cap recess of said second cap (36) as said end surface (40) of said second cap (36) abuts said recess end surface (28) at said second end of said housing (12), said exterior surface (38) of each of said end caps being spaced outwardly of said outer surface (14) of said housing (12) to define a step between said outer surface (14) of said housing (12) and said exterior surface (38) of each of said end caps, and a fusion bond between said distal end (32) of said peripheral projection and each of said transverse legs (44) of said cap recesses.

2. An assembly as set forth in claim 1 wherein said first end cap (34) includes a filter end support extending from said bottom of said cavity of said first end cap (34) for engaging and supporting a filter.

3. An assembly as set forth in claim 2 wherein said second end cap (36) includes a plug opening (54) wall extending into said cavity and including a plug (56) disposed in said plug opening (54).

4. An assembly as set forth in claim 3 including threads to threadedly engage said plug (56) in said plug opening (54).

5. An assembly as set forth in claim 4 wherein said housing (12) has a flat bottom (24) extending from end to end and a semi-circular top (20) extending end to end, a support rib (58) disposed in said chamber and spaced from said ends thereof for supporting a filter cartridge (52).

6. An assembly as set forth in claim 5 including a filter cartridge (52) disposed in said chamber, said filter cartridge (52) comprising a cylindrical core and cap seal (62) at one end and supported by and in sealing engagement with said filter end support, said first end cap (34) defining a first water passage (66) for establishing communication between said filter end support and said exterior of said first end cap (34), said cap seal (62) having a central hole (68) for the flow of water between the interior of said cylindrical core and said first water passage (66).

7. An assembly as set forth in claim 6 wherein said filter cartridge (52) includes an end piece (70) covering the other end of said cylindrical core, said end piece (70) being supported by said plug opening (54), said second end cap (36) defining a second water passage (72) for establishing communication between said end piece (70) and said chamber (16) and said exterior of said second end cap (36), said end piece (70) being solid to direct the flow of water between the interior of said cylindrical core and said second water passage (72).

8. An assembly as set forth in claim 7 wherein said filter chamber has a semi-circular top (20) defined by said top of said housing (12), said housing (12) having side walls (22) extending between said semi-circular top (20) and said flat bottom (24) and a partition (26) extending between said side walls (22) and said ends of said housing (12) for defining a second filter chamber having four sides as viewed in cross section, said first end cap (34) including a second filter end support and said second end cap (36) including a second plug opening (54) wall extending into said cavity thereof and including a second plug (56) disposed in said second plug opening (54), said first water passage (66) extending between said filter end supports in said first end cap (34) and said second water passage (72) having a second portion (74) extending between said plug openings (54) of said second end cap (36).

9. An assembly as set forth in claim 8 including a second filter cartridge (52) disposed in said second filter chamber.

10. An assembly as set forth in claim 9 including a second rib (60) defining a substantially circular hole for surrounding said second filter cartridge (52).

11. A water filtration housing assembly comprising;

an elongated housing (12) extending axially and having an outer surface (14) surrounding at least one filter chamber extending between first and second open ends, said outer surface (14) having a housing recess (27) extending radially and axially thereunto adjacent each of said first and second ends of said housing (12) and extending about the periphery of each end to define a recess end surface (28) extending radially and a peripheral projection (30) extending axially to a distal end (32) from said recess end surface (28) at each end of said housing (12), a first end cap (34) covering said first end, a second end cap (36) covering said second end, each of said end caps having an end face with a periphery and a peripheral wall having an exterior surface (38) extending from said periphery of said end face to an end surface (40), said peripheral wall and said end face defining an interior cavity with a bottom and interior wall surfaces, said end surface (40) having a L-shaped cap recess therein with an axially extending axial leg (42) and a radially extending transverse leg (44) extending about said end face with said transverse leg (44) opening into said interior cavity, said projection (30) at said first end of said housing (12) being disposed in engagement with said cap recess of said first cap (34) as said end surface (28) of said first cap (34) abuts said recess end surface (28) at said first end of said housing (12), said projection (30) at said second end of said housing (12) being disposed in engagement with said cap recess of said second cap (36) as said end surface (40) of said second cap (36) abuts said recess end surface (28) at said second end of said housing (12), said exterior surface (38) of each of said end caps being spaced outwardly of said outer surface (14) of said housing (12) to define a step between said outer surface (14) of said housing (12) and said exterior surface (38) of each of said end caps, and a fusion bond between said distal end (32) of said peripheral projection and each of said transverse lens (44) of said cap recesses flash, and (48) disposed about said distal end (32) of said peripheral projection (30) extending into said filter chamber.

12. A method of fabricating a water filtration assembly comprising the steps of;

forming an elongated housing (12) having an outer surface (14) surrounding at least one filter chamber extending between first and second open ends, forming a housing recess (27) in the outer surface (14) of the housing (12) adjacent each of the first and second ends of the housing (12) and extending about the periphery of each end to define a recess end surface (28) and a peripheral projection (30) extending to a distal end (32) from the recess end surface (28) at each end of the housing (12), forming a first end cap (34) for covering the first end, forming an outlet end cap for covering the second end, forming each end cap with an end face having a periphery and a peripheral wall having an exterior surface (38) extending from the periphery of the end face to an end surface (40) to define an interior cavity with a bottom and interior wall surfaces, forming a L-shaped cap recess in each end surface (40) with an axial leg (42) and a transverse leg (44) extending about the end face with the transverse leg (44) opening into the interior cavity, forming a two sided shoulder (46) filling the corner between the axial (42) and transverse (44) legs of the cap recess, inserting the projection (30) at the first end of the housing (12) into engagement with the cap recess of the first cap (34) as the distal end (32) of the projection (30) at the first end of the housing (12) abuts the shoulder (46) in the cap recess, inserting the projection (30) at the second end of the housing (12) into engagement with the cap recess of the second cap (36) as the distal end (32) of the projection (30) at the second end of the housing (12) abuts the shoulder (46) in the cap recess, and melting the respective shoulders (46) into a fusion bond between the distal end (32) of each projection (30) and each of the transverse legs (44) of the cap recesses.

13. A method as set forth in claim 12 including spacing the exterior surface (38) of each of the end caps outwardly of the outer surface (14) of the housing (12) to define a step between the outer surface (14) of the housing (12) and the exterior surface (38) of each of the end caps.

14. A method as set forth in claim 12 including forcing flash (48) from the melting of the shoulders (46) about the distal end (32) of the peripheral projection (30) and into the filter chamber.

15. A method as set forth in claim 12 including forming a plug opening (54) wall extending into said cavity of the second end cap (36) with threads therein and threading a plug (56) into the plug opening (54).

* * * * *